US008891761B2

(12) United States Patent
Minematsu

(10) Patent No.: US 8,891,761 B2
(45) Date of Patent: *Nov. 18, 2014

(54) BLOCK ENCRYPTION DEVICE, DECRYPTION DEVICE, ENCRYPTING METHOD, DECRYPTING METHOD AND PROGRAM

(75) Inventor: Kazuhiko Minematsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/982,690

(22) PCT Filed: Jan. 23, 2012

(86) PCT No.: PCT/JP2012/051326
§ 371 (c)(1),
(2), (4) Date: Jul. 30, 2013

(87) PCT Pub. No.: WO2012/105352
PCT Pub. Date: Aug. 9, 2012

(65) Prior Publication Data
US 2013/0308775 A1 Nov. 21, 2013

(30) Foreign Application Priority Data
Jan. 31, 2011 (JP) .................................. 2011-018359

(51) Int. Cl.
*H04L 9/00* (2006.01)
(52) U.S. Cl.
CPC ................ *H01L 9/28* (2013.01); *H01L 9/0625* (2013.01)
USPC .......................................................... 380/28
(58) Field of Classification Search
USPC ........................................................ 380/28
See application file for complete search history.

(56) References Cited

U.S. PATENT DOCUMENTS 7,418,100 B2 * 8/2008 McGrew et al. ................. 380/37
8,321,675 B2 * 11/2012 Rogaway ....................... 713/170
8,526,605 B2 * 9/2013 Matthews, Jr. .................. 380/44

FOREIGN PATENT DOCUMENTS

JP 2002-108205 A 4/2002
JP 2002-175008 A 6/2002

(Continued)

OTHER PUBLICATIONS

Moni Naor, et al., "On the Construction of Pseudo-Random Permutations: Luby-Rackoff Revisited", Electronic Colloquium on Computational Complexity (ECCC), 1999, pp. 1-35, vol. 4, No. 5.

(Continued)

*Primary Examiner* — Pramila Parthasarathy
(74) *Attorney, Agent, or Firm* — Sughrue Mion, PLLC

(57) ABSTRACT

A block encrypting device of the present invention includes: a mixing means (101) that applies universal hash function-based permutation to the (n+m)-bit plaintext to generate a first intermediate variable of n bits and a second intermediate variable of m bits; a first tweakable unit block encrypting means (102) that encrypts the first intermediate variable by use of an encrypting function of an m-bit tweakable n-bit block cipher, using the second intermediate variable as the tweak to generate a third intermediate variable of m bits and a fourth intermediate variable of (n−m) bits; a second tweakable unit block encrypting means (103) that encrypts an n-bit intermediate variable formed by connecting the second intermediate variable and the fourth intermediate variable, by use of the encrypting function, using the third intermediate variable as the tweak to generate a fifth intermediate variable of n bits; and an inverse mixing means (104) that applies universal hash function-based inverse-permutation to result obtained by connecting the third intermediate variable and the fifth intermediate variable to generate (n+m)-bit ciphertext.

12 Claims, 7 Drawing Sheets

(56) References Cited

FOREIGN PATENT DOCUMENTS

| | | |
|---|---|---|
| JP | 2007-034212 A | 2/2007 |
| JP | 2009-128773 A | 6/2009 |
| JP | 2010-522477 A | 7/2010 |
| WO | 2008/018303 A1 | 2/2008 |
| WO | 2008/053650 A1 | 5/2008 |
| WO | 2009/020060 A1 | 2/2009 |
| WO | 2010/024003 A1 | 3/2010 |
| WO | 2010/024004 A1 | 3/2010 |

OTHER PUBLICATIONS

Thomas Ristenpart, et al., "How to Enrich the Message Space of a Cipher", Fast Software Encryption, 14th International Workshop, FSE 2007, Luxembourg, Luxembourg, Mar. 26-28, 2007, Revised Selected Papers. Lecture Notes in Computer Science 4593 Springer 2007, pp. 101-118.

Stefan Lucks, "The Sum of PRPs Is a Secure PRF", Advances in Cryptology—EUROCRYPT 2000, International Conference on the Theory and Application of Cryptographic Techniques, Bruges, Belgium, May 14-18, 2000, Proceeding. Lecture Notes in Computer Science 1807 Springer 2000, pp. 470-484.

Jacques Patarin, "Security of Random Feistel Schemes with 5 or More Rounds", Advances in Cryptology—CRYPTO 2004, 24th Annual International Cryptology Conference, Santa Barbara, California, USA, Aug. 15-19, 2004, Proceedings. Lecture Notes in Computer 25 Science 3152 Springer 2004, pp. 106-122.

Ben Morris, et al., "How to Encipher Messages on a Small Domain: Deterministic Encryption and the Thorp Shuffle", Advances in Cryptology—CRYPTO 2009, 29th Annual International Cryptology Conference, Santa Barbara, CA, USA, Aug. 16-20, 2009. Proceedings. Lecture Notes in Computer Science 5677 Springer 2009, pp. 286-302.

Moses Liskov, et al., "Tweakable Block Ciphers", Advances in Cryptology—CRYPTO 2002, 22nd Annual International Cryptology Conference, Santa Barbara, California, USA, Aug. 18-22, 2002, Proceedings. Lecture Notes in Computer Science 2442 Springer 2002, pp. 31-46.

Shai Halevi, et al., "MMH: Software Message Authentication in the Gbit/second Rates", Fast Software Encryption, Feb. 1997, 4th International Workshop, FSE '97, Lecture Notes in Computer Science; vol. 1267.

David Goldenberg, et al., "On Tweaking Luby-Rackoff Blockciphers", Advances in Cryptology—ASIACRYPT 2007, $13^{th}$ International Convergence on the Theory and Application of Cryptology and Information Security, Kuching, Malaysia, Dec. 2-6, 2007, Proceedings, Lecture Notes in Computer Science 4833 Springer 2007, pp. 342-356.

Rich Schroeppel, "Hasty Pudding Cipher Specification", 1998, 19 pages, < http: www. cs. arizona. edu/ ~res/ hpc/ hpc-spec.>.

International Search Report for PCT/JP2012/051326, dated Mar. 19, 2012.

* cited by examiner

BLOCK ENCRYPTION DEVICE, DECRYPTION DEVICE, ENCRYPTING METHOD, DECRYPTING METHOD AND PROGRAM

CROSS REFERENCE TO RELATED APPLICATIONS

This application is a National Stage of International Application No. PCT/JP2012/051326 filed Jan. 23, 2012, claiming priority based on Japanese Patent Application No. 2011-018359 filed Jan. 31, 2011, the contents of all of which are incorporated herein by reference in their entirety.

TECHNICAL FIELD

The present invention relates to an operational mode of block ciphers, in particular, it relates to a technology of a bit block cipher equal to n and greater and less than 2n, that has versatility and high security based on an n-bit block cipher.

A block cipher is a set of permutation that is uniquely determined by a key. The input to, and the output from, the permutation correspond to plaintext and ciphertext, respectively. The length of the plaintext and ciphertext is called block size. A block cipher having a block size of n bits (n is an integer equal to or greater than 1) is generally called n-bit block cipher.

When a block cipher having a block size of 2n bits is constructed, there is a method of iterating 2n bit permutation using a process called an n-bit input-output round function. For example, DES (Data Encryption Standard) has a block size of 64 bits and is constructed by iterating permutation, called the Feistel permutation using a process called a round function of a 32 bit input/out length. In practical block ciphers such as DES and the like, the process of the round function is relatively simple and the output of the round function itself presents low randomness (is easily distinguishable as a random number), so that it is necessary to take the number of iteration of Feistel permutations high enough to enhance randomness of the 64 bits. In the case of DES, 16 iterations are performed.

Since the block size of block ciphers is generally fixed at 64, 128 or the like, it is not variable. If a block cipher is constructed with a block size other than these, it is usual to take an approach in which existing encrypting processes inclusive of block ciphers are used as components. The advantage of this approach is in that it becomes possible to perform a certain safety proof based on the metric safety of the components. For example, in the typical block cipher construction technique called Feistel permutation, if the output of the round function as a component presents high enough randomness that cannot be efficiently distinguished from a true random number, a 2n-bit block cipher, that is assured as to metric safety as a whole, will be produced by iteration of this Feistel permutation three to four times. This fact was proved by Luby and Rackoff.

Since it is considered that existing n-bit block ciphers have metrically high randomness, it is possible to construct a 128-bit block cipher using DES as its round function or it is possible to construct a 256-bit block cipher using AES (Advanced Encryption Standard) of a 128 bit block cipher, as its round function, based on the proved result of Luby and Rackoff.

The block cipher of this kind is called "double-block-length block cipher", which means that 2n-bit block size is realized using an existing block cipher of n-bit block size as its component.

There is also a technique that realizes a block size equal to n and greater and less than 2n, instead of the double block. When the block size to be realized is (n+m) bits (where m is 1 and greater and less than n), the block cipher of this block size is called "partial-block length block cipher".

These cipher functions are valuable in practical use in order to realize encryption in which plaintext and ciphertext have the same length (this will be called equi-length encryption). In normal CBC mode encryption and the like, plaintext of an arbitrary length can be encrypted but instead the resultant cipher text is added with a value called initial vector so that the ciphertext length becomes greater than the plaintext length. For example, when a 96 bit sequence is encrypted in equal length, in existing typical block ciphers, only two kinds of block size, 64 or 128, exist. Thus, it is necessary to realize a partial block cipher in some manner, using these as its components.

A method of constructing a double-block length block cipher is disclosed in, for example, non-patent document 1 by Naor and Reingold. This document proposes a method based on four Feistel permutations and others. FIGS. 11 and 12 show an example of a method using four Feistel permutations. FIG. 11 shows a procedural sequence of generating ciphertext $y_L$ and $y_R$ from plaintext $x_L$ and $x_R$, whereas FIG. 12 shows a procedural sequence of recovering plaintext $x_L$ and $x_R$ from ciphertext $y_L$ and $y_R$.

In almost all the cases inclusive of this method, the safety guarantee is limited to cases where q, which is the number of times of encryption to be processed with a single key, is sufficiently smaller than $2^{n/2}$ (this will be shown as $q \ll 2^{n/2}$). $2^{n/2}$ is called birthday bound, and an attack using the result of many number of times of encryption, whose number is nearly equal the birthday bound, is generally called birthday attack. Such an attack becomes a practical menace when a 64-bit block cipher is used, and poses a future risk even when a 128-bit block cipher is used, so that it is necessary to take countermeasures.

For example, it has been known that when four Feistel permutations are performed, an attack attributed to the birthday attack can be carried out, regardless of the round function.

On the other hand, in a case of a partial block length block cipher, XLS disclosed in non-patent document 2 of Ristenpart and Rogaway has been known. This realizes a (n+m)-bit block cipher by using an n-bit block cipher three times. Also, safety is limited to the case where q, which is the number of times of encryption to be processed by a single key, is sufficiently smaller than $2^{n/2}$, and only assures the safety below the birthday bound of n.

On the other hand, as a method of constructing a double-block length block cipher or partial block length ciphers having safety beyond the birthday bound of n, in non-patent document 1, non-patent document 3 and the like, it has been known that many number of Feistel permutations, whose number is a greater than the number which is proved by Luby and Rackoff, are performed to achieve this object. Upon this, a Feistel permutation with its input unequally divided may be used depending on the case. However, there occur problems in which any of schemes based on the Feistel permutation needs an extremely high number of times of iteration compared to the limit of safety to be attained, and in which depending on the block size of the target, degradation of safety is unallowable if the block cipher is directly used as the function to be a component (the safety may fall to the birthday bound), and others.

The latter problem can be solved by using the technique described in non-patent document 4, or by using a block cipher as a component after transforming the block cipher into a function that has no inverse function, though this leads to a further increase in the amount of computation. For example, non-patent document 1 discloses that (n+m) times of round function calls is needed in order to improve the limit of q to $2^{(n+m)/2}$ in the (n+m)-bit partial-block length block cipher. Though non-patent document 5 insists that it is possible to realize safety that exceeds the birthday bound by use of a relatively lower number of iteration (six times) of Feistel permutation, the proof is asymptotic, posing a problem of difficulty in performing quantitative safety evaluation.

RELATED ART DOCUMENTS

Non-patent Documents

Non-patent document 1: M. Naor, O. Reingold, On the Construction of Pseudo-Random Permutations: Luby-Rackoff Revisited, Electronic Colloquium on Computational Complexity (ECCC) 4(5), 1997.

Non-patent document 2: T. Ristenpart and P. Rogaway. How to Enrich the Message Space of a Cipher, Fast Software Encryption, 14th International Workshop, FSE 2007, Luxembourg, Luxembourg, Mar. 26-28, 2007, Revised Selected Papers. Lecture Notes in Computer Science 4593 Springer 2007, pp. 101-118.

Non-patent document 3: B. Morris, P. Rogaway, and T. Stegers., How to Encipher Messages on a Small Domain: Deterministic Encryption and the Thorp Shuffle, Advances in Cryptology—CRYPTO 2009, 29th Annual International Cryptology Conference, Santa Barbara, Calif., USA, Aug. 16-20, 2009. Proceedings. Lecture Notes in Computer Science 5677 Springer 2009, pp. 286-302.

Non-patent document 4: S. Lucks, The Sum of PRPs Is a Secure PRF, Advances in Cryptology—EUROCRYPT 2000, International Conference on the Theory and Application of Cryptographic Techniques, Bruges, Belgium, May 14-18, 2000, Proceeding. Lecture Notes in Computer Science 1807 Springer 2000, pp. 470-484.

Non-patent document 5: J. Patarin, Security of Random Feistel Schemes with 5 or More Rounds, Advances in Cryptology—CRYPTO 2004, 24th Annual International Cryptology Conference, Santa Barbara, Calif., USA, Aug. 15-19, 2004, Proceedings. Lecture Notes in Computer Science 3152 Springer 2004, pp. 106-122.

SUMMARY OF THE INVENTION

The above-described methods of constructing a partial-block length block cipher using block ciphers, inevitably entail either the problem in which safety can be guaranteed up to the birthday bound but in which no safety is assured above that bound or the problem in which the method is extremely inefficient though it can assure safety beyond the birthday bound.

An exemplary object of the invention is to provide a block encryption device, a decryption device, an encrypting method, a decrypting method and a program to be executed by a computer, which ensure safety beyond the birthday bound and provide good processing efficiency.

A block encrypting device according to an exemplary aspect of the invention includes: when n is an integer equal to 1 or greater and m is an integer equal to 1 or greater and less than n, a plaintext input means to which (n+m)-bit plaintext to be encrypted is input; a mixing means that applies universal hash function-based permutation to the (n+m)-bit plaintext to generate a first intermediate variable of n bits and a second intermediate variable of m bits; a first tweakable unit block encrypting means that encrypts the first intermediate variable by use of an encrypting function of an m-bit tweakable n-bit block cipher, using the second intermediate variable as the tweak to generate a third intermediate variable of m bits and a fourth intermediate variable of (n−m) bits; a second tweakable unit block encrypting means that encrypts an n-bit intermediate variable formed by connecting the second intermediate variable and the fourth intermediate variable, by use of the encrypting function of an m-bit tweakable n-bit block cipher, using the third intermediate variable as the tweak to generate a fifth intermediate variable of n bits; an inverse mixing means that applies universal hash function-based inverse-permutation to result obtained by connecting the third intermediate variable and the fifth intermediate variable to generate (n+m)-bit ciphertext; and, a ciphertext output means that outputs the (n+m)-bit ciphertext.

A block decrypting device according to an exemplary aspect of the invention includes: when n is an integer equal to 1 or greater and m is an integer equal to 1 or greater and less than n, a ciphertext input means to which (n+m)-bit ciphertext to be decrypted is input; a mixing means that applies universal hash function-based permutation to the (n+m)-bit ciphertext to generate a first intermediate variable of m bits and a second intermediate variable of n bits; a second tweakable unit block decrypting means that decrypts the second intermediate variable by use of a decrypting function of an m-bit tweakable n-bit block cipher, using the first intermediate variable as the tweak to generate a third intermediate variable of (n−m) bits and a fourth intermediate variable of m bits; a first tweakable unit block decrypting means that decrypts an n-bit intermediate variable formed by connecting the first intermediate variable and the third intermediate variable, by use of the decrypting function of an m-bit tweakable n-bit block cipher, using the fourth intermediate variable as the tweak to generate a fifth intermediate variable of n bits; an inverse mixing means that applies universal hash function-based inverse-permutation to result obtained by connecting the fifth intermediate variable and the fourth intermediate variable to generate (n+m)-bit plaintext; and, a plaintext output means that outputs the (n+m)-bit plaintext.

Also, the encrypting method according to an exemplary aspect of the invention is an encrypting method for generating ciphertext from (n+m)-bit plaintext, where n is an integer equal to 1 or greater and m is an integer equal to 1 or greater and less than n, comprising the steps of: applying universal hash function-based permutation to the (n+m)-bit plaintext to generate a first intermediate variable of n bits and a second intermediate variable of m bits; encrypting the first intermediate variable by use of an encrypting function of an m-bit tweakable n-bit block cipher, using the second intermediate variable as the tweak to generate a third intermediate variable of m bits and a fourth intermediate variable of (n−m) bits; encrypting an n-bit intermediate variable formed by connecting the second intermediate variable and the fourth intermediate variable, by use of the encrypting function of an m-bit tweakable n-bit block cipher, using the third intermediate variable as the tweak to generate a fifth intermediate variable of n bits; applying universal hash function-based inverse-permutation to result obtained by connecting the third intermediate variable and the fifth intermediate variable to generate (n+m)-bit ciphertext; and, outputting the (n+m)-bit ciphertext.

The decrypting method according to an exemplary aspect of the invention is a decrypting method for generating plaintext from (n+m) ciphertext, comprising: when n is an integer equal to 1 or greater and m is an integer equal to 1 or greater and less than n, applying universal hash function-based permutation to the (n+m)-bit ciphertext to generate a first intermediate variable of m bits and a second intermediate variable of n bits; decrypting the second intermediate variable by use of a decrypting function of an m-bit tweakable n-bit block cipher, using the first intermediate variable as the tweak to generate a third intermediate variable of (n−m) bits and a fourth intermediate variable of m bits; decrypting an n-bit intermediate variable formed by connecting the first intermediate variable and the third intermediate variable, by use of the decrypting function of an m-bit tweakable n-bit block cipher, using the fourth intermediate variable as the tweak to generate a fifth intermediate variable of n bits; applying universal hash function-based inverse-permutation to result obtained by connecting the fifth intermediate variable and the fourth intermediate variable to generate (n+m)-bit plaintext; and, outputting the (n+m)-bit plaintext.

Further, the program according to an exemplary aspect of the invention is a program for causing a computer to execute the encrypting method of the above invention. Moreover, the program according to one aspect of the present invention is a program for causing a computer to execute the decrypting method of the above invention.

MODE FOR CARRYING OUT THE INVENTION

The block encrypting device and the decrypting device of the present exemplary embodiment enable efficient construction of a partial block length block cipher having safety that exceeds the birthday bound for n, using real block ciphers. The block encrypting device and decrypting device of the present exemplary embodiment are devices relating to a partial block length block cipher. Hereinbelow, the block encrypting device of the present exemplary embodiment is called "partial block length block cipher device" and the decrypting device of the present exemplary embodiment is called "partial block length block decipher device.

The First Exemplary Embodiment

Figure 1:
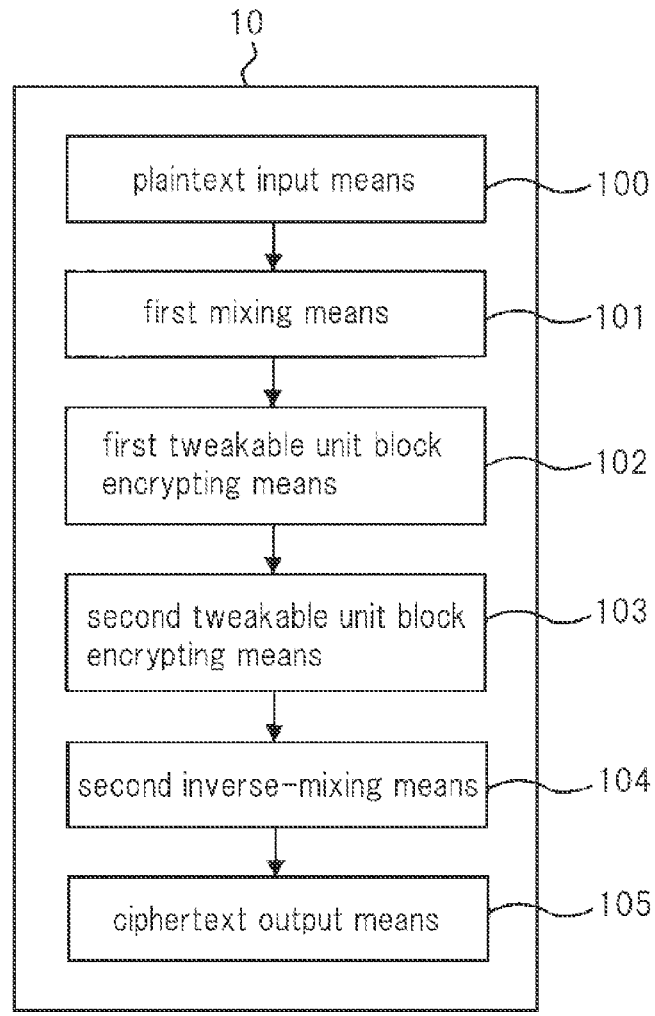
FIG. 1 is a block diagram showing one configurational example of a partial block length block encrypting device of the first exemplary embodiment.

The configuration of the partial block length block encrypting device of the present exemplary embodiment will be described. FIG. 1 is a block diagram showing one configurational example of a partial block length block encrypting device of the present exemplary embodiment.

As shown in FIG. 1, partial block length block encrypting device 10 of the present exemplary embodiment includes plaintext input means 100, first mixing means 101, first tweakable unit block encrypting means 102, second tweakable unit block encrypting means 103, second inverse-mixing means 104 and ciphertext output means 105.

Figure 2:
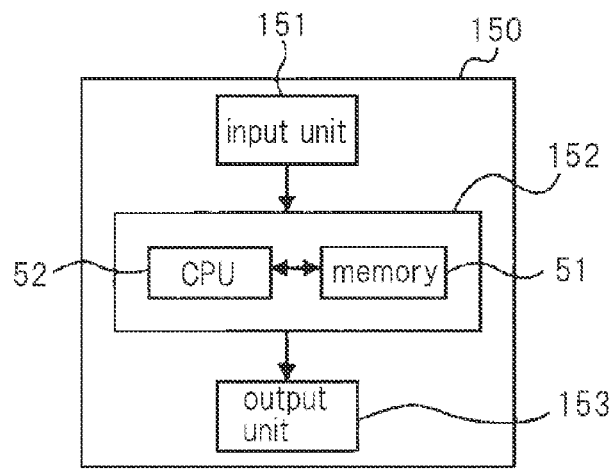
FIG. 2 is a block diagram showing one configurational example of an information processing device that realizes the partial block length block encrypting device shown in FIG. 1.

Partial block length block encrypting device 10 shown in FIG. 1 can be realized by information processing device 150 shown in FIG. 2. As shown in FIG. 2, information processing device 150 is a kind of computer having input unit 151, control unit 152 and output unit 153. Control unit 152 includes memory 51 for storing a program and CPU (Central Processing Unit) 52 for executing processing in accordance with the program.

As CPU 52 executes the program, first mixing means 101, first tweakable unit block encrypting means 102, second tweakable unit block encrypting means 103 and second inverse-mixing means 104 shown in FIG. 1 are virtually configured in information processing unit 150. Input unit 151 corresponds to plaintext input means 100 while output means 153 corresponds to ciphertext output means 105.

Here, memory 51 corresponds to the main storage of a non-volatile memory and RAM (Random Access Memory) and the like. However, it is also possible to provide an auxiliary storage (not shown) having a large-capacity storage area such as a hard disk drive in information processing unit 150. When the program size is too large to be stored in memory 51, the program may be stored in the auxiliary storage, and the part describing the content of the process to be executed next is successively loaded from the program on the auxiliary storage into memory 51 in the progress of the processing of CPU 52, whereby it is possible to execute the processing of large-sized program.

Figure 3:
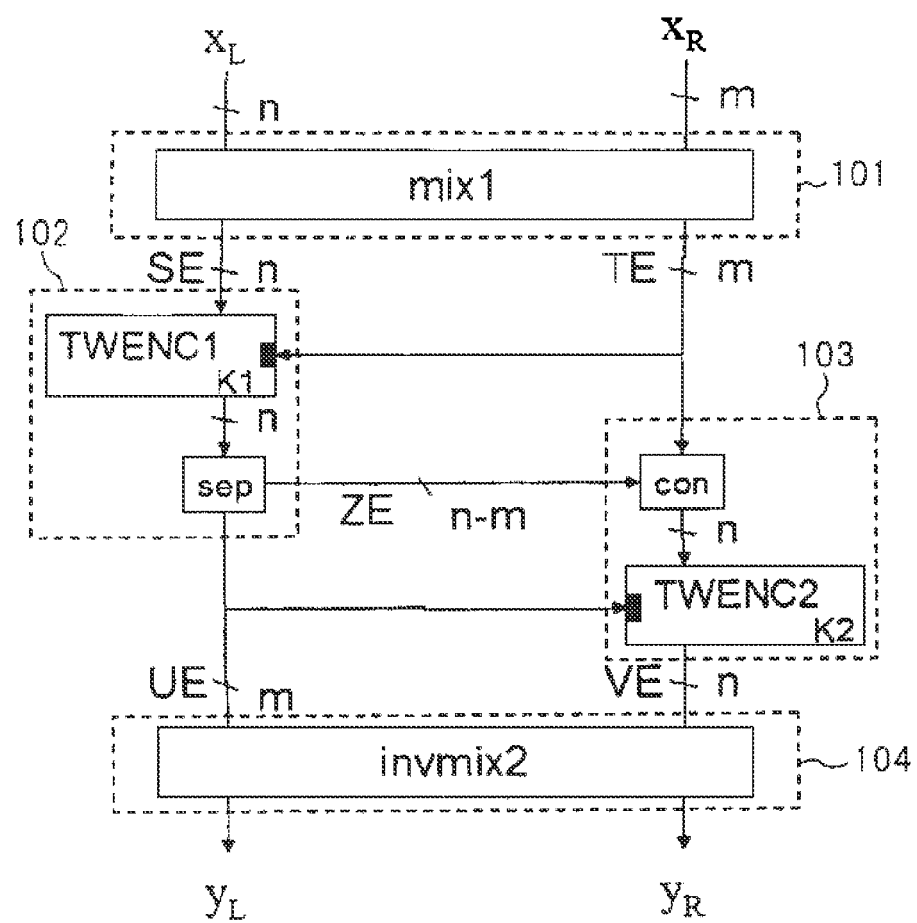
FIG. 3 is a diagram showing the flow of information processing in the partial block length block encrypting device of the first exemplary embodiment.

Next, the individual means that constitute partial block length block encrypting device 10 shown in FIG. 1 will be described. FIG. 3 is a diagram showing the flow of information processing in the partial block length block encrypting device of the present exemplary embodiment.

The present exemplary embodiment will be described taking a case in which the block size to be targeted is (n+m) bits (m is 1 or greater and less than n), the block size of the tweakable block cipher used inside is n bits and the length of the tweak is m bits.

The tweakable block cipher indicates a block cipher that performs encryption by using a parameter called tweak, along with a secret key. The tweakable block cipher is conditioned such that if a tweak and a key is determined, plaintext and cipher text correspond one to another. That is, if the encrypting function TWENC of a tweakable block cipher and the corresponding decrypting function TWDEC exist, plaintext M, cipher text C and tweak T always satisfy the Eq. (1).

[Equation 1]

$$C=TWENC(K,T,M) \leftrightarrow M=TWDEC(K,T,C) \quad \text{Eq. (1)}$$

In this equation, the bidirectional arrow shows the equivalence of left and right propositions. Since the formal definition and safety requirements of the tweakable block cipher including Eq. (1) are disclosed in non-patent document 6, a detailed description is omitted. Non-patent document 6 is "M. Liskov, R. Rivest, D. Wagner, Tweakable Block Ciphers, Advances in Cryptology—CRYPTO 2002, 22nd Annual International Cryptology Conference, Santa Barbara, Calif., USA, Aug. 18-22, 2002, Proceedings. Lecture Notes in Computer Science 2442 Springer 2002, pp. 31-46."

Plaintext input means 100 is a means for inputting plaintext of (n+m) bits to be encrypted. Plaintext input means 100 is a text input device such as, for example a keyboard and the like. Plaintext input means 100 may be an interface device for receiving data from another device connected thereto, or may be a reading device that reads out data from a magnetic recording medium or an optical disk.

First mixing means 101 applies a simple key-attached permutation mix1 to the input (n+m)-bit plaintext.

Key-attached permutation mix 1 defines two different arbitrary (n+m) bit plaintext x and x' as $x=(x_L, x_R)$ and $x'=(x'_L, x'_R)$. Here, $x_L$ and $x'_L$ are of n bits and $x_R$ and $x'_R$ are of m bits. Key-attached permutation mix 1 defines the corresponding outputs of mix 1 as (SE,TE)=mix1($x_L,x_R$) and (SE',TE')j=mix1($x'_L,x'_R$). Here, SE and SE' are of n bits and TE and TE' are of m bits. In this case, the following condition (Eq. (2)) is required to hold for a sufficiently small e, as to any plaintext pair.

[Equation 2]

$$Pr[TE=TE'] \leq e \quad \text{Eq. (2)}$$

Here, the probability is defined by the randomness of the key of mix1.

Specifically, mix1 can be implemented by using an unbalanced Feistel permutation. This can be done by Eq. (3) and Eq. (4), using key-attached function H of n-bit input and m-bit output.

[Equation 3]

$$TE=(H(x_L)+x_R) \quad \text{Eq. (3)}$$

[Equation 4]

$$SE=x_L \quad \text{Eq. (4)}$$

Here, + represents exclusive OR (XOR) for every bit.

Herein, if key-attached function H satisfies Eq. (5) for different arbitrary $x_L$ and $x'_L$, the condition Eq. (2) will hold.

[Equation 5]

$$Pr[(H(x_L)-H(x'_L)=d)] \leq e \quad \text{Eq. (5)}$$

When H satisfied this condition, H is called "e-almost XOR universal". This is a kind of a universal hash function and can be realized by multiplication of the input on the finite field and the key.

Figure 4:
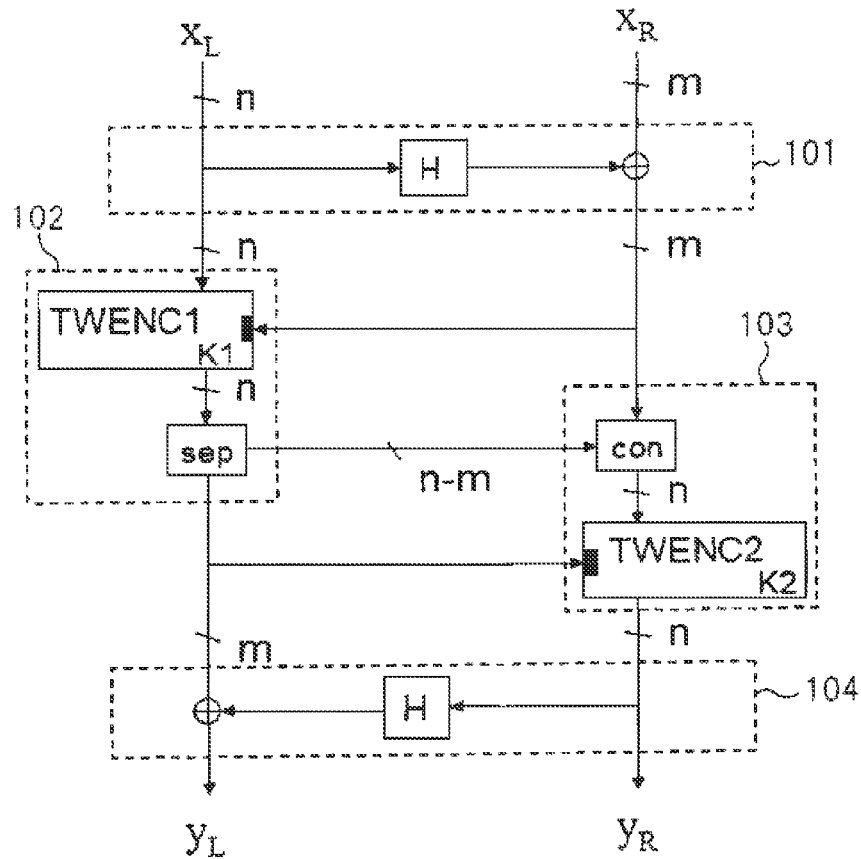
FIG. 4 is a diagram showing a configurational example for the first mixing means and the second inverse-mixing means shown in FIG. 1 when a configuration different from that shown in FIG. 3 is provided.

Alternatively, as disclosed in non-patent document 7, a function specialized for a specific environment of implementation may be used. Non-patent document 7 is "S. Halevi and H. Krawczyk, MMH: Software Message Authentication in the Gbit/second rates, Fast Software Encryption, 4th International Workshop, FSE '97, Lecture Notes in Computer Science; Vol. 1267, February 1997". A configuration is shown in FIG. 4 when first mixing means 101 is realized using the method disclosed herein. FIG. 4 shows a case in which a mixing means and an inverse mixing means are realized by Feistel permutation.

First tweakable unit block encrypting means 102 performs an encrypting process using the output from first mixing means 101. Specifically, for (SE, TE) (SE is n bits, TE is m bits), that is the output from first mixing means 101, first tweakable unit block encrypting means 102 operates as Eq. (6), using encrypting function TWENC1 of a certain tweakable block cipher.

[Equation 6]

$$(UE||ZE)=TWENC1(K1,TE,SE) \quad \text{Eq. (6)}$$

Here, TWENC1(K1,(TE,SE)) represents a process of encrypting n-bit plaintext SE, based on key K1 and m-bit tweak TE. "||" denotes a connection of bits. Eq. (6) produces an output of n bits, in total, made up of m bits of UE and (n−m) bits of ZE. SE of n bits corresponds to a first intermediate variable and TE of m bits corresponds to a second intermediate variable. UE of m bits corresponds to a third intermediate variable and ZE of (n−m) bits corresponds to a fourth intermediate variable.

The tweakable block cipher used in first tweakable unit block encrypting means 102 has a block size of n bits with an m-bit tweak, as shown by Eq. (6).

As a specific configuring method, there is a method that adds a tweak to part of intermediate variables for the existing block cipher or its serial combination. The validity of this approach for a Feistel cipher is disclosed in, for example, non-patent document 8. Non-patent document 8 is "D. Goldenberg, S. Hohenberger, M. Liskov, E. C. Schwartz, H. Seyalioglu, On Tweaking Luby-Rackoff Blockciphers, Advances in Cryptology—ASIACRYPT 2007, 13th International Convergence on the Theory and Application of Cryptology and Information Security, Kuching, Malaysia, Dec. 2-6, 2007, Proceedings, Lecture Notes in Computer Science 4833 Springer 2007, pp. 342-356".

It is also possible to configure the cipher by using key update of a block cipher depending on the tweak without modifying the algorithm of an existing (usual, with no tweak) n-bit block cipher. For example, if encrypting function E of a normal block cipher of n-bit block having an L (L is a positive integer equal to n or greater; 2n, for example)-bit key and L-bit block encrypting function G are given, then TWENC1 can be defined as Eq. (7).

[Equation 7]

$$\left. \begin{array}{l} TWENC1(K1, T, M) = E(V, M) \\ V = G(K1, \text{pad}(T)) \end{array} \right\} \quad \text{Eq. (7)}$$

Here, E(V, M) is encryption of n-bit plaintext M based on V of L bits as a key, and pad(T) is a padding process (e.g., adding zeros, and the like) to form T of m bits into L bits. G(K1, pad(T)) is encryption of L-bit pad (T) based on key K1. TWENC in this case is shown in FIG. 5.

Figure 5:
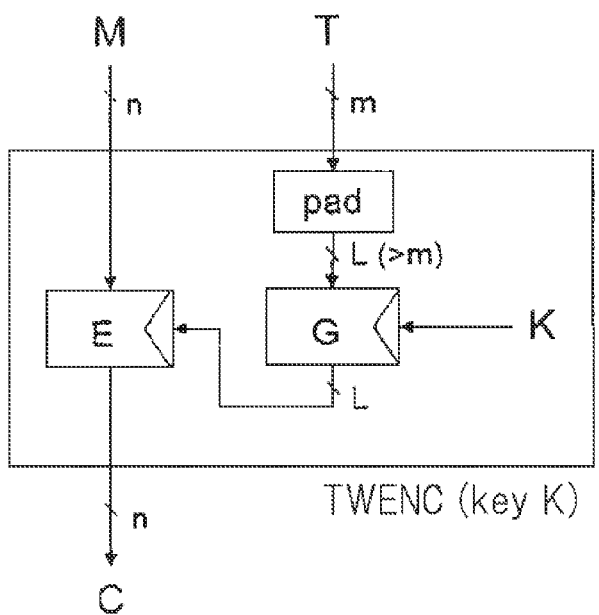
FIG. 5 is a diagram for illustrating an encrypting function of a tweakable block cipher used in the partial block length block encrypting device in the first exemplary embodiment.

As shown in FIG. 5, for an arbitrary positive integer L equal to n or greater, encrypting function TWENC, using encrypting function E of a block cipher of an n-bit block and an L-bit key and encrypting function G of an L-bit block, encrypts n-bit plaintext, using the result that is obtained by encrypting an m-bit tweak by use of encrypting function G, as the key for encrypting function E.

In FIG. 5, for the case of first tweakable unit block encrypting means 102, TWENC shown in FIG. 5 is denoted as TWENC1 and key K shown in FIG. 5 is denoted as K1. On the other hand, for the case of second tweakable unit block encrypting means 103, TWENC shown in FIG. 5 is denoted as TWENC2 and key K shown in FIG. 5 is denoted as K2.

For example, when n=64 and L=112, E may use a 2-key Triple DES encrypting function and G may use an AES encrypting function (here, the output should be reduced from 128 bits to 112 bits as appropriate). When an AES encrypting function is used for G, it is possible to use an encrypting function of a 64 bit block cipher such as Blow fish, MISTY1 (n=64, L=128), etc., for E as other option. When this TWENC1 is used, the process of Eq. (6) is given as Eq. (8).

[Equation 8]

$$(UE \| ZE) = TWENC1(K1, TE, SE) = E(V, SE) \\ V = G(K1, pad(TE)) \quad\quad\quad\quad\quad\quad\quad\quad\quad \text{Eq. (8)}$$

In FIG. 3, "sep" indicates a dividing process of intermediate variables and "con" shown in FIG. 3 indicates a connection of binary sequences.

Second tweakable unit block encrypting means 103 performs an encrypting process using m-bit UE and (n−m)-bit ZE, that are output in accordance with Eq. (6), and n-bit TE, in first tweakable unit block encrypting means 102.

Specifically, second tweakable unit block encrypting means 103 produces Eq. (9) using encrypting function TWENC2 (m-bit tweak, n-bit block) of a certain tweak block cipher.

[Equation 9]

$$VE = TWENC2(K2, UE, (ZE \| TE)) \quad\quad \text{Eq. (9)}$$

Here, UE, ZE and TE conform to Eq. (6) and K2 is the key for TWENC2. The n-bit VE corresponds to a fifth intermediate variable.

Encrypting function TWENC2 may be either an algorithm different from TWENC1 that is used by first tweakable unit block encrypting means 102, or may be the same algorithm. In the latter case, for arbitrary M, K and T, TWENC2(K,T,M)=TWENC1(K,T,M) holds. Further, K2 may be either the same as key K1 used by first tweakable unit block encrypting means 102, or may be independent.

Second inverse mixing means 104 performs a process of applying a simple key-attached permutation invmix 2 to the (n+m) bit output from second tweakable unit block encrypting means 102. If the input to second inverse mixing means 104 is (UE, VE), the output is given as invmix2(UE, VE).

When mix2 is the inverse permutation of invmix2 (in other words, mix2(invmix2(x))=x for an arbitrary (n+m)-bit x), mix2 is assumed to have the same characteristics as mix1 of first mixing means 101.

Specifically, two different arbitrary (n+m)-bit ciphertext y and y' are defined as y=($y_L$,$y_R$) and y'=($y'_L$,$y'_R$). Here, $y_L$ and $y'_L$ are of m bits and $y_R$ and $y'_R$ are of n bits. Further, (UE, VE), the corresponding outputs from mix2 are defined as (UE, VE)=mix2($y_L$,$y_R$) and (UE',VE')j=mix2($y'_L$,$y'_R$). In this case, the following condition (Eq. (10)) is required to hold for a sufficiently small g, in any pair of ciphertext.

[Equation 10]

$$Pr[UE=UE'] \leq g \quad\quad \text{Eq. (10)}$$

Here, mix2 may be defined as the mix1's process that is reversed left and right. When mix2 is determined, invmix2 is determined uniquely.

Specifically, invmix2 may be a Feistel permutation similar to mix1. At this time, if the input to invmix2 is (UE, VE) and the output is ($y_L$,$y_R$), then invmix2 may be put as Eq. (11).

[Equation 11]

$$yL = H(VE) + UE \\ yR = VE \quad\quad\quad\quad\quad \text{Eq. (11)}$$

The key of key-attached function H used herein may be either the same as the key of H used by first mixing means 101, or may be independent. FIG. 4 shows a configuration when second inverse mixing means 104 is realized by using Feistel permutation.

Ciphertext output means 105 is a means that outputs (n+m)-bit ciphertext ($y_L$,$y_R$) that is input from second inverse mixing means 104. This can be realized by a display device, printer or the like.

Figure 6:
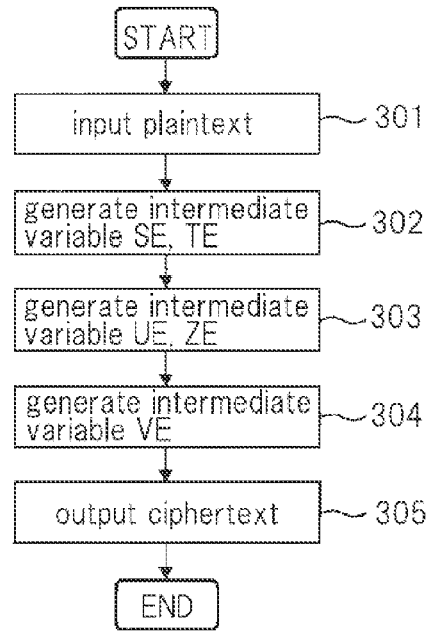
FIG. 6 is a flow chart showing the operational sequence of the partial block length block encrypting device in the first exemplary embodiment.

Next, the operation of partial block length block encrypting device 10 of the present exemplary embodiment will be described. FIG. 6 is a flow chart showing the operational sequence of the partial block length block encrypting device in the present exemplary embodiment.

As plaintext ($x_L$,$x_R$) is input to plaintext input means 100 (Step 301), first mixing means 101 mixes the plaintext ($x_L$,$x_R$) using key-attached permutation to determine intermediate variables (SE, TE) (Step 302). Next, first tweakable unit block encrypting means 102 encrypts intermediate variable SE in accordance with Eq. (6), using a certain m-bit part of intermediate variable TE as a tweak to determine intermediate variables UE and ZE (Step 303). Subsequently, second tweakable unit block encrypting means 103 encrypts the connected result of intermediate variable ZE and intermediate variable TE, using a certain m-bit part of intermediate variable UE as a tweak to determine intermediate variable VE (Step 304). Thereafter, second inverse mixing means 104 inverse-mixes intermediate variables (UE, VE) by using key-attached inverse permutation to generate ciphertext ($y_L$,$y_R$) so that ciphertext ($y_L$,$y_R$) is output from ciphertext output means 105 (Step 305).

The Second Exemplary Embodiment

Figure 7:
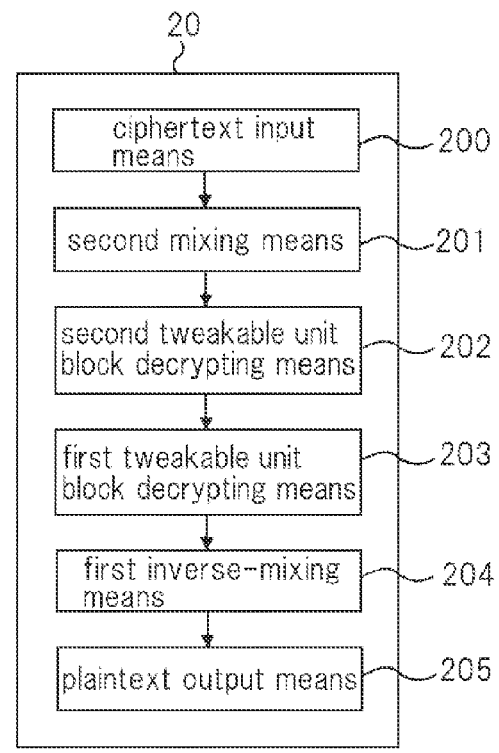
FIG. 7 is a block diagram showing one configurational example of a partial block length block decrypting device of the second exemplary embodiment.

The configuration of the partial block length block decrypting device of the present exemplary embodiment will be described. FIG. 7 is a block diagram showing one configurational example of a partial block length block decrypting device of the present exemplary embodiment.

Partial block length block decrypting device 20 of the present exemplary embodiment includes ciphertext input means 200, second mixing means 201, second tweakable unit block decrypting means 202, first tweakable unit block decrypting means 203, first inverse-mixing means 204 and plaintext output means 205.

Here, partial block length block decrypting device 10 shown in FIG. 7 can be realized by information processing device 150 shown in FIG. 2, so that the detailed description is omitted herein.

Figure 8:
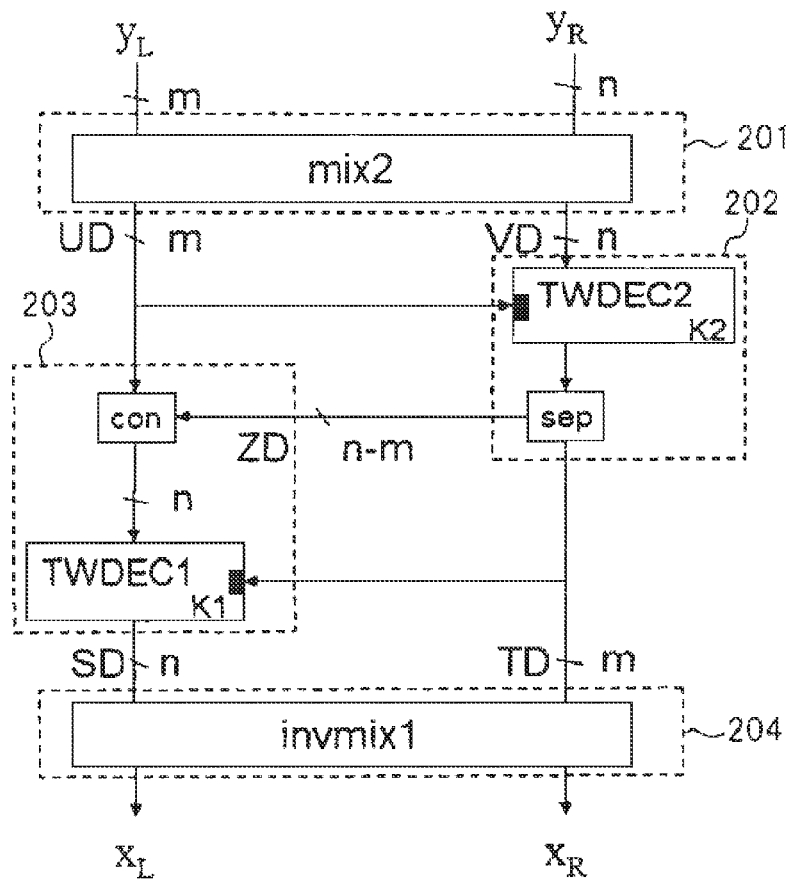
FIG. 8 is a diagram showing the flow of information processing in the partial block length block decrypting device of the second exemplary embodiment.

Next, the individual means that constitute partial block length block decrypting device 20 shown in FIG. 7 will be described. FIG. 8 is a diagram showing the flow of information processing in the partial block length block decrypting device of the present exemplary embodiment.

This exemplary embodiment will also be described taking a case where the block size to be targeted is (n+m) bits (m is 1 or greater and less than n), the block size of the tweakable block cipher used inside is n bits and the length of the tweak is m bits.

Ciphertext input means 200 is a means for inputting ciphertext of (n+m) bits to be decrypted. Ciphertext input means 200 is a text input device such as, for example a keyboard and the like. Ciphertext input means 200 may be an interface device or a reading device.

Second mixing means 201 applies a key-attached permutation mix2 to the input ciphertext of (n+m) bits. Key-attached permutation mix2 may be the inverse function of invmix2 in the first exemplary embodiment.

Second tweakable unit block decrypting means 202 performs a decrypting process using the output from second mixing means 201. Specifically, when the output from second mixing means 201 is given as (UD, VD) (UD is of m bits, VD is of n bits), second tweakable unit block decrypting means 202 calculates Eq. (12) from (UD, VD) or determines ZD of (n−m) bits and TD of m bits to output (ZD, UD, TD), using decrypting function TWDEC2 corresponding to encrypting function TWENC2 of the tweakable block cipher used in second tweakable unit block encrypting means 103 in the first exemplary embodiment.

[Equation 12]

$$(ZD\|TD) = TWDEC2(K2, UD, VD) \qquad \text{Eq. (12)}$$

Key K2 of TWDEC2 is the same value as K2 in Eq. (9). UD of m bits corresponds to a first intermediate variable, VD of n bits corresponds to a second intermediate variable, ZD of (n−m) bits corresponds to a third intermediate variable and TD of m bits corresponds to a fourth intermediate variable.

If TWENC2 is implemented by encrypting function E of a block cipher of n-bit block having an L-bit key and L-bit block encrypting function G similarly to Eq. (7), TWDEC2 is defined by Eq. (13), using decrypting function D corresponding to encrypting function E.

[Equation 13]

$$\left.\begin{array}{l} TWDEC2(K, T, C) = D(V, C) \\ V = G(K, \mathrm{pad}(T)) \end{array}\right\} \qquad \text{Eq. (13)}$$

Figure 9:
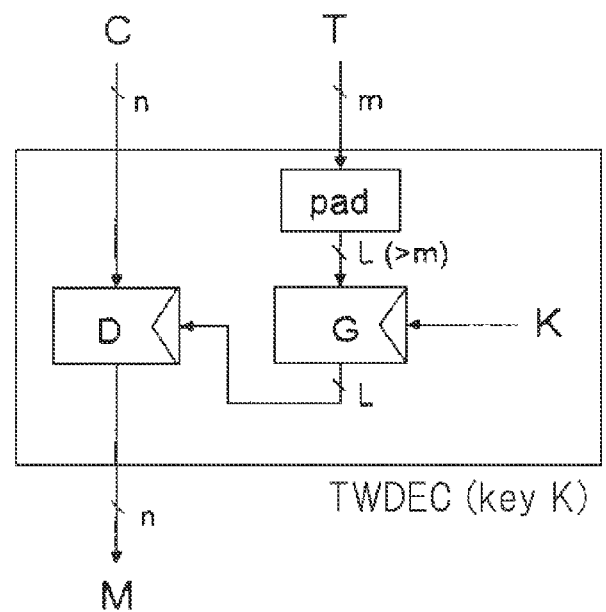
FIG. 9 is a diagram for illustrating a decrypting function of a tweakable block cipher used in the partial block length block decrypting device of the second exemplary embodiment.

TWDEC in this case is shown in FIG. 9.

As shown in FIG. 9, for an arbitrary positive integer L equal to n or greater, decrypting function TWDEC, using decrypting function D of block cipher of n-bit block having an L-bit key and L-bit block encrypting function G, decrypts n-bit ciphertext, using the result that is obtained by encrypting an m-bit tweak by use of encrypting function G, as the key for decrypting function D.

In FIG. 9, for the case of first tweakable unit block decrypting means 203, TWDEC shown in FIG. 9 is denoted as TWDEC1 and key K shown in FIG. 9 is denoted as K1. For the case of second tweakable unit block decrypting means 202, TWDEC shown in FIG. 9 is denoted as TWDEC2 and key K shown in FIG. 9 is denoted as K2.

When this TWDEC2 is used, the process of Eq. (12) is given as Eq. (14).

[Equation 14]

$$\left.\begin{array}{l} TD = TWDEC2(K2, UD, VD) = D(V, VD) \\ V = G(K2, \mathrm{pad}(UD)) \end{array}\right\} \qquad \text{Eq. (14)}$$

First tweakable unit block decrypting means 203 is a decrypting process using the output from second tweakable unit block decrypting means 202.

Specifically, first tweakable unit block decrypting means 203, using decrypting function TWDEC1 corresponding to encrypting function TWENC1 (m-bit tweak, n-bit block) of the tweakable block cipher used by first tweakable unit block encrypting means 102 in the first exemplary embodiment, produces Eq. (15) and outputs (SD, TD) from (UD, ZD, TD).

[Equation 15]

$$SD = TWDEC1(K1, TD, (ZD\|UD)) \qquad \text{Eq. (15)}$$

Key K1 of TWDEC1 is the same value as K1 in Eq. (6). If TWENC1 is implemented as in Eq. (8), TWDEC1 is given by Eq. (16), by virtue of decrypting function D of block cipher of n-bit block having an L-bit key and L-bit block encrypting function G, similarly to TWDEC2.

[Equation 16]

$$\left.\begin{array}{l} SD = TWDEC1(K1, TD, (ZD\|UD)) = D(V, UD) \\ V = G(K1, \mathrm{pad}(TD)) \end{array}\right\} \qquad \text{Eq. (16)}$$

The n-bit SD corresponds to a fifth intermediate variable. Decrypting function TWDEC1 may be either an algorithm different from TWDEC2 used by second tweakable unit block decrypting means 202, or the same algorithm. In the latter case, for arbitrary C, K and T, TWDEC1(K,T,C)=TWDEC2(K,T,C) holds. Further, K1 may be either the same as key K2 used by second tweakable unit block decrypting means 202, or independent.

First inverse mixing means 204 applies a key-attached permutation invmix 1 to the output from first tweakable unit block decrypting means 203. Invmix is the inverse-permutation of permutation mix used by first mixing means 101 in the first exemplary embodiment.

Plaintext output means 205 is a means that outputs plaintext $(x_L, x_R)$ given from first inverse mixing means 204. This can be realized by a display device, printer or the like.

Figure 10:
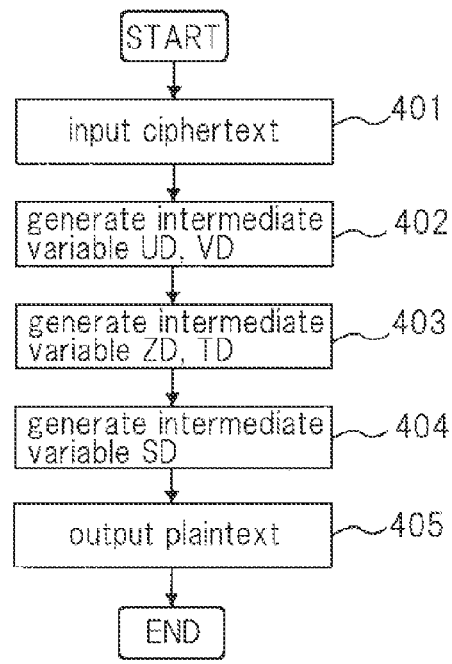
FIG. 10 is a flow chart showing the operational sequence of the partial block length block decrypting device in the second exemplary embodiment.
Figure 11:
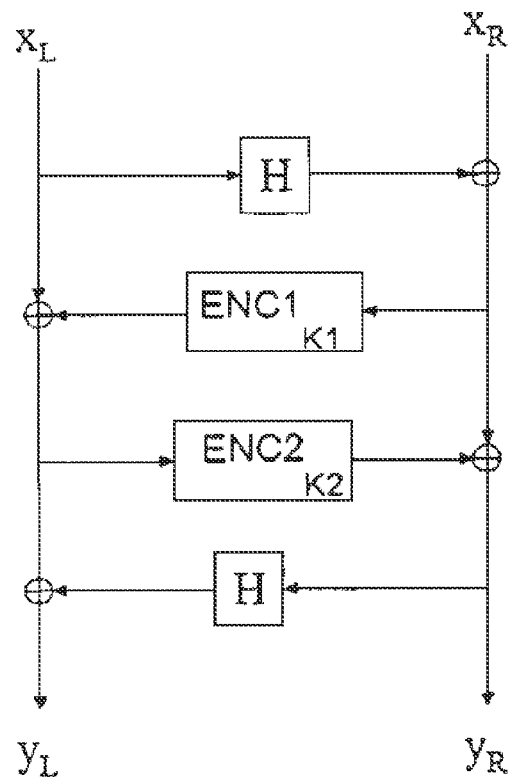
FIG. 11 is a diagram showing one configurational example of a related encrypting device for a double block length block cipher.
Figure 12:
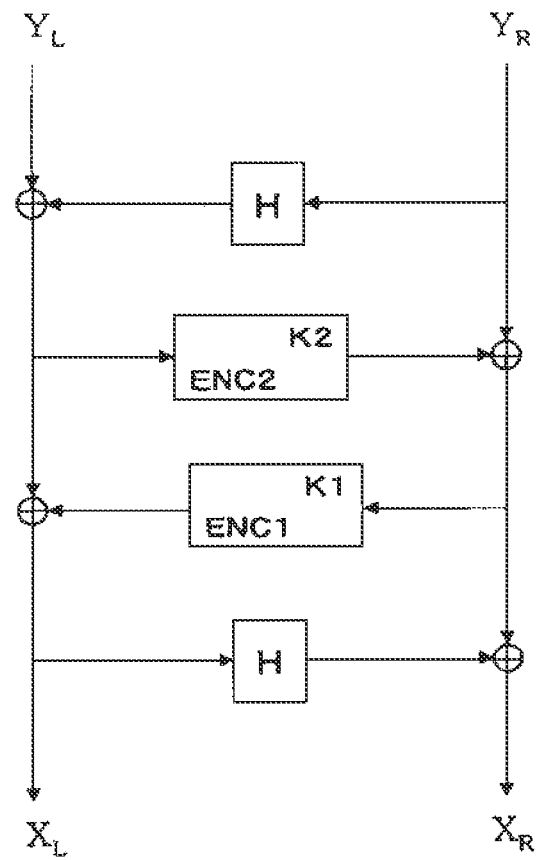
FIG. 12 is a diagram showing one configurational example of a related decrypting device for a double block length block cipher.

Next, the operation of partial block length block decrypting device 20 of the present exemplary embodiment will be described. FIG. 10 is a flow chart showing the operational sequence of the partial block length block decrypting device in the present exemplary embodiment.

As ciphertext $(y_L, y_R)$ is input to ciphertext input means 200 (Step 401), second mixing means 201 mixes the ciphertext $(y_L, y_R)$ using key-attached permutation to determine intermediate variables (UD, VD) (Step 402). Next, second tweakable unit block decrypting means 202 decrypts intermediate variable VD in accordance with Eq. (12), using a certain m-bit part of intermediate variable UD as a tweak to determine intermediate variables ZD and TD (Step 403). Subsequently, first tweakable unit block decrypting means 203 decrypts the connected result of intermediate variable UD and intermediate variable ZD, using a certain m-bit part of intermediate variable TD as a tweak to determine intermediate variable SD (Step 404). Thereafter, first inverse mixing means 204 inverse-mixes intermediate variables (SD, TD) by using key-attached inverse permutation to generate plaintext $(x_L, x_R)$ so that plaintext $(x_L, x_R)$ is output from plaintext output means 205 (Step 405).

According to the first and second exemplary embodiments, since the tweakable block cipher (of n-bit block with an m-bit tweak) used as a component is theoretically safe and offers theoretic safety when the number of plain/ciphertext pairs used by an attacker is sufficiently smaller than $2^{(n+m)/2}$, theoretical endurance against a birthday attack is assured. Accordingly, it is possible to realize an efficient partial block length cipher that guaranties safety beyond the birthday bound. The strength of endurance becomes greater proportional to m.

Though the tweakable block cipher itself is required to have safety beyond the birthday bound, this can be realized with a normal block cipher, depending on the length of the tweak (determined depending on the level of required safety). Further, there exists a tweakable block cipher algorithm designed from the beginning as Hasty Pudding Cipher described in non-patent document 9, or there has been offered an approach of creating a tweakable block cipher by adding tweaks to the intermediate variables in an algorithm for normal block cipher, as disclosed in non-patent document 8. The algorithms based on these achievements also make it possible to realize tweakable block ciphers having safety beyond the birthday bound of n.

Non-patent document 9 is "R. Schroeppel, Specification for the Hasty Pudding Cipher, http:www.cs.arizona.edu/~rcs/hpc/hpc-spec."

Further, in the above-described exemplary embodiment, a process called mixing is needed at top and tail. This can be realized by a universal hash function, and it is possible to achieve a markedly higher speed operation than block cipher, by optimization in accordance with the implement environment.

When the (n+m)-bit block cipher, that is described in the above exemplary embodiment, as one example of the present invention is concretely used for encryption in communication and data storage, it is considered that the (n+m)-bit block cipher is used as a cipher mode. That is, information such as packets or the like to be encrypted is divided every (n+m) bits so that CBC (Cipher Block Chaining) mode can be applied for communication. In encryption of a data storage such a hard disk or the like, use of the scheme described in non-patent document 6 is applicable. Also, it is possible to efficiently encrypt a message of a particular length that is different from the normal block cipher.

For example, when n=64 and m=32, it is possible to perform 96-bit isometric encryption. Since isometric encryption is free from any increase in output data, which occurs in encryption in normal CBC and the like, isometric encryption is effective in reducing communication band and keeping data format for encryption. In the above case of 96-bit isometric encryption, though only the safety of 32 bits (i.e., safety by $2^{32}$ times of encryption) is assured in the method disclosed in non-patent document 2, it is possible to assure the safety of 48 bits in the present invention by combining the above-described 64-bit block cipher and 128-bit block cipher.

As an exemplary advantage of the present invention, it is possible to efficiently realize a partial block length block cipher that assures safety beyond the birthday bound.

Further, not limited to the program of the present invention, a computer-readable recording medium that is recorded with the program of the present invention may be provided. Not limited to the case of transmitting the program of the present invention to another information processing apparatus via a communication network, the program of the present invention may be installed in another information processing apparatus by way of a recording medium.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention can be used for purposes such as authentication, encryption and the like in wireless and wired data communications and for purposes such as encryption and prevention against falsification of data that is stored in storage.

This application is based upon and claims the benefit of priority from Japanese Patent Application No. 2011-18359 filed on Jan. 31, 2011, the content of which is incorporated by reference.

DESCRIPTION OF REFERENCE NUMERALS

10 partial block length block encrypting device
20 partial block length block decrypting device
100 plaintext input means
101 first mixing means
102 first tweakable unit block encrypting means
103 second tweakable unit block encrypting means
104 second inverse mixing means
105 ciphertext output means
200 ciphertext input means
201 second mixing means
202 second tweakable unit block decrypting means
203 first tweakable unit block decrypting means
204 first inverse mixing means
205 plaintext output means

The invention claimed is:

1. A block encrypting device comprising:
a processor;
memory storing executable instructions that, when executed by the processor, causes the processor to perform the steps of:
inputting (n+m)-bit plaintext to be encrypted, when n is an integer equal to 1 or greater and m is an integer equal to 1 or greater and less than n;
applying universal hash function-based permutation to the (n+m)-bit plaintext to generate a first intermediate variable of n bits and a second intermediate variable of m bits;
encrypting the first intermediate variable by use of an encrypting function of an m-bit tweakable n-bit block cipher, using the second intermediate variable as the tweak to generate a third intermediate variable of m bits and a fourth intermediate variable of (n−m) bits;
encrypting an n-bit intermediate variable formed by connecting the second intermediate variable and the fourth intermediate variable, by use of the encrypting function of an m-bit tweakable n-bit block cipher, using the third intermediate variable as the tweak to generate a fifth intermediate variable of n bits;
applying universal hash function-based inverse-permutation to result obtained by connecting the third intermediate variable and the fifth intermediate variable to generate (n+m)-bit ciphertext; and outputting the (n+m)-bit ciphertext.

2. The block encrypting device according to claim 1, wherein the universal hash function-based permutation and the universal hash function-based inverse permutation consist of Feistel permutation using an n-bit input m-bit output universal hash function as a round function.

3. The block encrypting device according to claim 1, wherein for an arbitrary positive integer L equal to n or greater, the encrypting function of an m-bit tweakable n-bit block cipher, using encrypting function E of a block cipher of an n-bit block and an L-bit key and encrypting function G of an L-bit block, encrypts n-bit plaintext, using result that is obtained by encrypting a tweak by the encrypting function G, as the key for encrypting function E.

4. A decrypting device comprising:

a processor;

memory storing executable instructions that, when executed by the processor, causes the processor to perform the steps of:

inputting (n+m)-bit ciphertext to be decrypted, when n is an integer equal to 1 or greater and m is an integer equal to 1 or greater and less than n;

applying universal hash function-based permutation to the (n+m)-bit ciphertext to generate a first intermediate variable of m bits and a second intermediate variable of n bits;

decrypting the second intermediate variable by use of a decrypting function of an m-bit tweakable n-bit block cipher, using the first intermediate variable as the tweak to generate a third intermediate variable of (n-m) bits and a fourth intermediate variable of m bits;

decrypting an n-bit intermediate variable formed by connecting the first intermediate variable and the third intermediate variable, by use of the decrypting function of an m-bit tweakable n-bit block cipher, using the fourth intermediate variable as the tweak to generate a fifth intermediate variable of n bits;

applying universal hash function-based inverse-permutation to result obtained by connecting the fifth intermediate variable and the fourth intermediate variable to generate (n+m)-bit plaintext; and outputting the (n+m)-bit plaintext.

5. The decrypting device according to claim 4, wherein the universal hash function-based permutation and the universal hash function-based inverse permutation consist of Feistel permutation using an n-bit input m-bit output universal hash function as a round function.

6. The decrypting device according to claim 4, wherein for an arbitrary positive integer L equal to n or greater, the decrypting function of an m-bit tweakable n-bit block cipher, using decrypting function D of a block cipher of an n-bit block and an L-bit key and decrypting function G of an L-bit block, decrypts n-bit ciphertext, using result that is obtained by encrypting a tweak by the encrypting function G, as the key for decrypting function D.

7. An encrypting method for generating ciphertext from (n+m)-bit plaintext, where n is an integer equal to 1 or greater and m is an integer equal to 1 or greater and less than n, comprising:

applying, using a processor, universal hash function-based permutation to the (n+m)-bit plaintext to generate a first intermediate variable of n bits and a second intermediate variable of m bits;

encrypting the first intermediate variable by use of an encrypting function of an m-bit tweakable n-bit block cipher, using the second intermediate variable as the tweak to generate a third intermediate variable of m bits and a fourth intermediate variable of (n−m) bits;

encrypting an n-bit intermediate variable formed by connecting the second intermediate variable and the fourth intermediate variable, by use of the encrypting function of an m-bit tweakable n-bit block cipher, using the third intermediate variable as the tweak to generate a fifth intermediate variable of n bits;

applying universal hash function-based inverse-permutation to result obtained by connecting the third intermediate variable and the fifth intermediate variable to generate (n+m)-bit ciphertext; and outputting the (n+m)-bit ciphertext.

8. A decrypting method for generating plaintext from (n+m) ciphertext, where n is an integer equal to 1 or greater and m is an integer equal to 1 or greater and less than n, comprising:

applying, using a processor, universal hash function-based permutation to the (n+m)-bit ciphertext to generate a first intermediate variable of m bits and a second intermediate variable of n bits;

decrypting the second intermediate variable by use of a decrypting function of an m-bit tweakable n-bit block cipher, using the first intermediate variable as the tweak to generate a third intermediate variable of (n−m) bits and a fourth intermediate variable of m bits;

decrypting an n-bit intermediate variable formed by connecting the first intermediate variable and the third intermediate variable, by use of the decrypting function of an m-bit tweakable n-bit block cipher, using the fourth intermediate variable as the tweak to generate a fifth intermediate variable of n bits;

applying universal hash function-based inverse-permutation to result obtained by connecting the fifth intermediate variable and the fourth intermediate variable to generate (n+m)-bit plaintext; and outputting the (n+m)-bit plaintext.

9. A non-transitory computer-readable recording medium recorded with a program for causing a computer to execute a process of generating ciphertext from (n+m)-bit plaintext, where n is an integer equal to 1 or greater and m is an integer equal to 1 or greater and less than n, comprising:

applying universal hash function-based permutation to the (n+m)-bit plaintext to generate a first intermediate variable of n bits and a second intermediate variable of m bits;

encrypting the first intermediate variable by use of an encrypting function of an m-bit tweakable n-bit block cipher, using the second intermediate variable as the tweak to generate a third intermediate variable of m bits and a fourth intermediate variable of (n−m) bits;

encrypting an n-bit intermediate variable formed by connecting the second intermediate variable and the fourth intermediate variable, by use of the encrypting function of an m-bit tweakable n-bit block cipher, using the third intermediate variable as the tweak to generate a fifth intermediate variable of n bits;

applying universal hash function-based inverse-permutation to result obtained by connecting the third intermediate variable and the fifth intermediate variable to generate (n+m)-bit ciphertext; and outputting the (n+m)-bit ciphertext.

10. A non-transitory computer-readable recording medium recorded with a program for causing a computer to execute a process of generating ciphertext from (n+m)-bit plaintext, where n is an integer equal to 1 or greater and m is an integer equal to 1 or greater and less than n, comprising:

applying universal hash function-based permutation to the (n+m)-bit ciphertext to generate a first intermediate variable of m bits and a second intermediate variable of n bits;

decrypting the second intermediate variable by use of a decrypting function of an m-bit tweakable n-bit block cipher, using the first intermediate variable as the tweak to generate a third intermediate variable of (n−m) bits and a fourth intermediate variable of m bits;

decrypting an n-bit intermediate variable formed by connecting the first intermediate variable and the third intermediate variable, by use of the decrypting function of an m-bit tweakable n-bit block cipher, using the fourth intermediate variable as the tweak to generate a fifth intermediate variable of n bits;

applying universal hash function-based inverse-permutation to result obtained by connecting the fifth intermediate variable and the fourth intermediate variable to generate (n+m)-bit plaintext; and outputting the (n+m)-bit plaintext.

11. The block encrypting device according to claim 2, wherein for an arbitrary positive integer L equal to n or greater, the encrypting function of an m-bit tweakable n-bit block cipher, using encrypting function E of a block cipher of an n-bit block and an L-bit key and encrypting function G of an L-bit block, encrypts n-bit plaintext, using result that is obtained by encrypting a tweak by the encrypting function G, as the key for encrypting function E.

12. The decrypting device according to claim 5, wherein for an arbitrary positive integer L equal to n or greater, the decrypting function of an m-bit tweakable n-bit block cipher, using decrypting function D of a block cipher of an n-bit block and an L-bit key and decrypting function G of an L-bit block, decrypts n-bit ciphertext, using result that is obtained by encrypting a tweak by the encrypting function G, as the key for decrypting function D.

* * * * *